US012655973B1

(12) United States Patent
Rivera Mendoza et al.

(10) Patent No.: US 12,655,973 B1
(45) Date of Patent: Jun. 16, 2026

(54) ADDITIVELY MANUFACTURABLE FILTER FOR GAS TURBINE

(71) Applicant: GE Vernova Infrastructure Technology LLC, Greenville, SC (US)

(72) Inventors: Carmen Montserrat Rivera Mendoza, Queretaro (MX); Cesar Corona Bravo, Santiago de Queretearo (MX); Donald Mark Bailey, Simpsonville, SC (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 19/095,527

(22) Filed: Mar. 31, 2025

(51) Int. Cl.
| | |
|---|---|
| *F23K 5/18* | (2006.01) |
| *B22F 10/28* | (2021.01) |
| *B33Y 10/00* | (2015.01) |
| *B33Y 80/00* | (2015.01) |
| *F02C 7/22* | (2006.01) |

(52) U.S. Cl.
CPC ................ *F23K 5/18* (2013.01); *B22F 10/28* (2021.01); *F02C 7/22* (2013.01); *B33Y 10/00* (2014.12); *B33Y 80/00* (2014.12); *F05D 2250/232* (2013.01); *F05D 2260/607* (2013.01); *F23K 2300/202* (2020.05)

(58) Field of Classification Search
CPC ........ F23K 2300/202; F23K 5/18; F02C 7/22; F02C 7/222; F02C 3/30; B01D 29/31; B01D 29/33; B01D 29/35; B01D 35/005; B01D 2325/021; B01D 2325/0214; F05D 2260/607; B22F 10/28
See application file for complete search history.

(56) References Cited

U.S. PATENT DOCUMENTS

| | | | |
|---|---|---|---|
| 9,849,510 B2 | 12/2017 | Lacy et al. | |
| 10,202,871 B2 * | 2/2019 | Ryon ..................... | F02C 7/222 |
| 10,605,409 B2 * | 3/2020 | Veto ........................ | B64D 1/16 |
| 10,773,310 B2 | 9/2020 | Kottilingam et al. | |
| 11,230,976 B2 | 1/2022 | Annamalai et al. | |
| 11,519,334 B2 | 12/2022 | Stoia et al. | |
| 2004/0069704 A1 * | 4/2004 | Yamaguchi .......... | F02M 61/165 210/498 |
| 2008/0219088 A1 * | 9/2008 | Wood ..................... | B01F 23/23 435/295.1 |

(Continued)

FOREIGN PATENT DOCUMENTS

| | | | | |
|---|---|---|---|---|
| CA | 3099515 A1 * | 6/2021 | ............. | B01D 46/66 |
| CN | 107321027 A * | 11/2017 | ............. | B23P 15/00 |
| CN | 108568160 A * | 9/2018 | ............. | B01D 39/12 |

*Primary Examiner* — Alain Chau
(74) *Attorney, Agent, or Firm* — Dority & Manning, P.A.

(57) ABSTRACT

A combustor includes a combustion liner that defines a combustion chamber. The combustor further includes a fluid supply line for providing a fluid to the combustion chamber. The combustor further includes a filter disposed in fluid communication with the fluid supply line for removing particulates from the fluid. The filter extends along a center axis from a forward end to an aft end. The filter includes a base flange defining an open base at the forward end, a downstream segment defining the aft end, and a filter screen extending between the base flange and the downstream segment. The filter screen defines an interior and a plurality of apertures having a non-circular shape sized to permit the fluid to pass from the interior of the filter and prevent particulates from passing from the interior.

18 Claims, 10 Drawing Sheets

(56)                    References Cited

U.S. PATENT DOCUMENTS

| | | | | |
|---|---|---|---|---|
| 2011/0265438 A1* | 11/2011 | Ryan | B01D 35/02 |
| | | | 55/503 |
| 2017/0009724 A1* | 1/2017 | Izzo | F02M 61/165 |
| 2017/0204746 A1* | 7/2017 | Ryon | F02C 7/222 |
| 2019/0003646 A1* | 1/2019 | Veto | B64C 15/14 |
| 2019/0017444 A1* | 1/2019 | Annamalai | F02C 7/268 |
| 2024/0310047 A1 | 9/2024 | Joshi | |

\* cited by examiner

800

IRRADIATE A LAYER OF POWDER IN A POWDER
BED TO FORM A FUSED REGION          802

PROVIDE A SUBSEQUENT LAYER OF POWDER
OVER THE POWDER BED BY PASSING A RECOATER
ARM OVER THE POWDER BED          804

REPEAT STEPS 802 AND 804 UNTIL
THE FILTER IS FORMED IN THE POWDER BED          806

ADDITIVELY MANUFACTURABLE FILTER FOR GAS TURBINE

FIELD

The present disclosure relates generally to a filter for removing particulates from fluids provided to a combustion section of a gas turbine. Particularly, the present disclosure is related to a filter having one or more features that facilitate additive manufacturing of the filter.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

The combustion section of the turbomachine typically includes one or more combustors that are provided with air and fuel (such as liquid fuel and/or gaseous fuel) to produce the combustion gases. Additionally, many combustors include water injection for flame stabilization. The gaseous fuel, liquid fuel, and/or water provided to the combustor may carry particulates that can damage the hardware of the combustor or disrupt combustion. As such, an improved filter for removing particulates from fluids provided to the combustion section is desired.

Filters that are provided along fluid lines in the combustion section of the turbomachine are typically small (e.g., having a length in the range of about 0.80 inches to about 4.5 inches) with an even smaller maximum diameter at the inlet end (e.g., in the range of about 0.7 inches to about 2.4 inches). The screen portion of the filter contains a large number of very small apertures for trapping particulates, which are defined through a thin wall. Additive manufacturing of such filters ideally provides multiple benefits in terms of rapid fabrication, customized aperture sizes and patterns, and integral components. However, due to the number of the apertures, the short overall length of the filters, and the filter wall thinness, additive manufacturing of such filters has been difficult to achieve without distorting or collapsing the apertures or the filter itself during the build process. Thus, an improved filter having one or more features that facilitate additive manufacturing of the filter would be advantageous.

BRIEF DESCRIPTION

Aspects and advantages of the filters, combustors, and methods of fabricating filters in accordance with the present disclosure will be set forth in part in the following description, or may be obvious from the description, or may be learned through practice of the technology.

In accordance with one embodiment, a combustor for a gas turbine is provided. The combustor includes a combustion liner that defines a combustion chamber. The combustor further includes a fluid supply line for providing a fluid to the combustion chamber. The combustor further includes a filter disposed in fluid communication with the fluid supply line for removing particulates from the fluid. The filter extends along a center axis from a forward end to an aft end. The filter includes a base flange defining an open base at the forward end, a downstream segment defining the aft end, and a filter screen comprising a thin wall extending between the base flange and the downstream segment. The filter screen defines an interior and a plurality of apertures having a non-circular shape, the plurality of apertures being sized to permit the fluid to pass from the interior of the filter and prevent particulates from passing from the interior.

In accordance with another embodiment, a filter for removing particulates from a fluid provided to a combustor of a gas turbine is provided. The filter extends along a center axis from a forward end to an aft end. The filter includes a base flange defining an open base at the forward end, a downstream segment defining the aft end, and a filter screen comprising a thin wall extending between the base flange and the downstream segment. The filter screen defines an interior and a plurality of apertures having a non-circular shape, the plurality of apertures being sized to permit fluid to pass from the interior of the filter and prevent particulates from passing from the interior.

In accordance with another embodiment, a method for fabricating a thin wall filter using an additive manufacturing system is provided. The method includes (a) irradiating a layer of powder in a powder bed to form a fused region. The powder bed is disposed on a build plate. The method further includes (b) providing a subsequent layer of powder over the powder bed by passing a recoater arm over the powder bed. The method further includes repeating steps (a) and (b) until the filter is formed on the build plate. The filter includes a base flange defining an open base, a downstream segment, and a filter screen comprising a thin wall extending between the base flange and the downstream segment. The filter screen defines an interior and a plurality of apertures having a non-circular shape, the plurality of apertures being sized to permit the fluid to pass from the interior of the filter and prevent particulates from passing from the interior.

These and other features, aspects and advantages of the present filters, combustors, and methods of fabricating filters will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present filters, combustors, and methods of fabricating filters, including the best mode of making and using the present systems and methods, directed to one of ordinary skill in the art, is set forth in the specification, which makes reference to the appended figures, in which.

DETAILED DESCRIPTION

Figure 1:
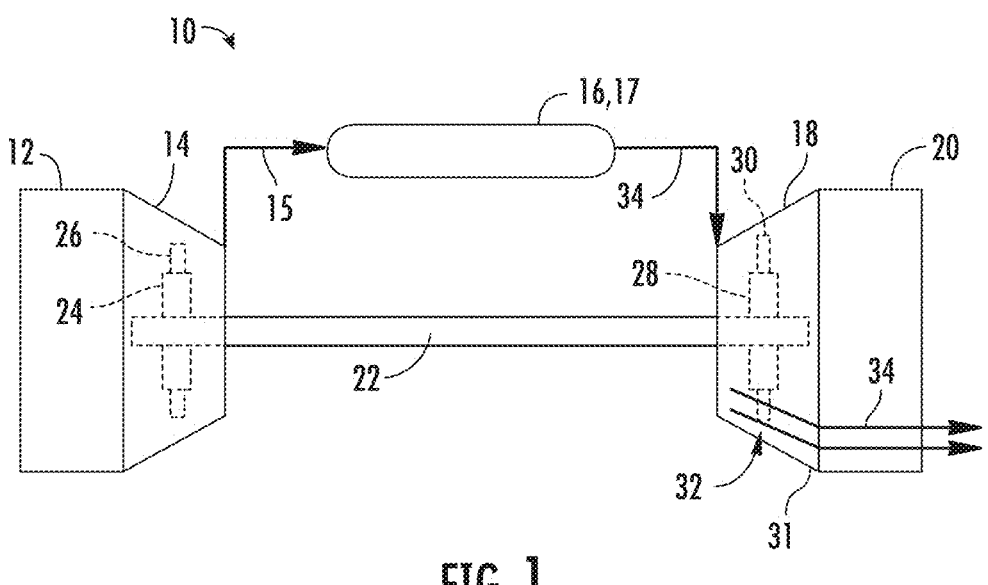
FIG. 1 is a schematic illustration of a turbomachine in accordance with embodiments of the present disclosure.

Reference now will be made in detail to embodiments of the present filters, combustors, and methods of fabricating filters, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may refer to a gas or a liquid. The term "fluid communication" means that a fluid is capable of making the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within five degrees greater or less than the stated angle or direction. For example, "generally vertical" includes directions within five degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, the phrase "and/or" is satisfied by any one of the following: A is true (or present) and B is false (or not present), A is false (or not present) and B is true (or present), and both A and B are true (or present).

Here and throughout the specification and claims, where range limitations may be combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "line" may refer to a pipe, hose, tube, or other fluid carrying conduit.

Referring now to the drawings, FIG. 1 illustrates a schematic diagram of one embodiment of a turbomachine, which in the illustrated embodiment is a gas turbine engine 10. Although an industrial or land-based gas turbine is shown and described herein, the present disclosure is not limited to an industrial or land-based gas turbine engine unless otherwise specified in the claims. For example, the technology as described herein may be used in any type of turbomachine including but not limited to a steam turbine, an aircraft gas turbine, or a marine gas turbine.

As shown, gas turbine engine 10 generally includes an inlet section 12, a compressor section 14 disposed downstream of the inlet section 12, a plurality of combustors 17 (shown in FIG. 2) within a combustion section 16 disposed downstream of the compressor section 14, a turbine section 18 disposed downstream of the combustion section 16, and an exhaust section 20 disposed downstream of the turbine section 18. Additionally, the gas turbine engine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form an upstream portion of the shaft 22 that extends through the compressor section 14. The compressor section 14 further includes a plurality of stationary vanes (not shown), which are arranged in stages with the rotor blades 26 and which direct the flow against the rotor blades 26.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a downstream portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18. The turbine section 18 further includes a plurality of stationary vanes (not shown), which are arranged in stages with the rotor blades 30 and which direct the flow against the rotor blades 30.

During operation, a working fluid such as air flows through the inlet section 12 and into the compressor section 14 where the air is progressively compressed by multiple compressor stages of rotating blades and stationary vanes, thus providing pressurized air to the combustors 17 of the combustion section 16. The pressurized air is mixed with fuel and burned within each combustor 17 to produce combustion gases 34. The combustion gases 34 flow through the hot gas path 32 from the combustion section 16 into the turbine section 18, in which energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine engine 10 via the exhaust section 20.

Figure 2:
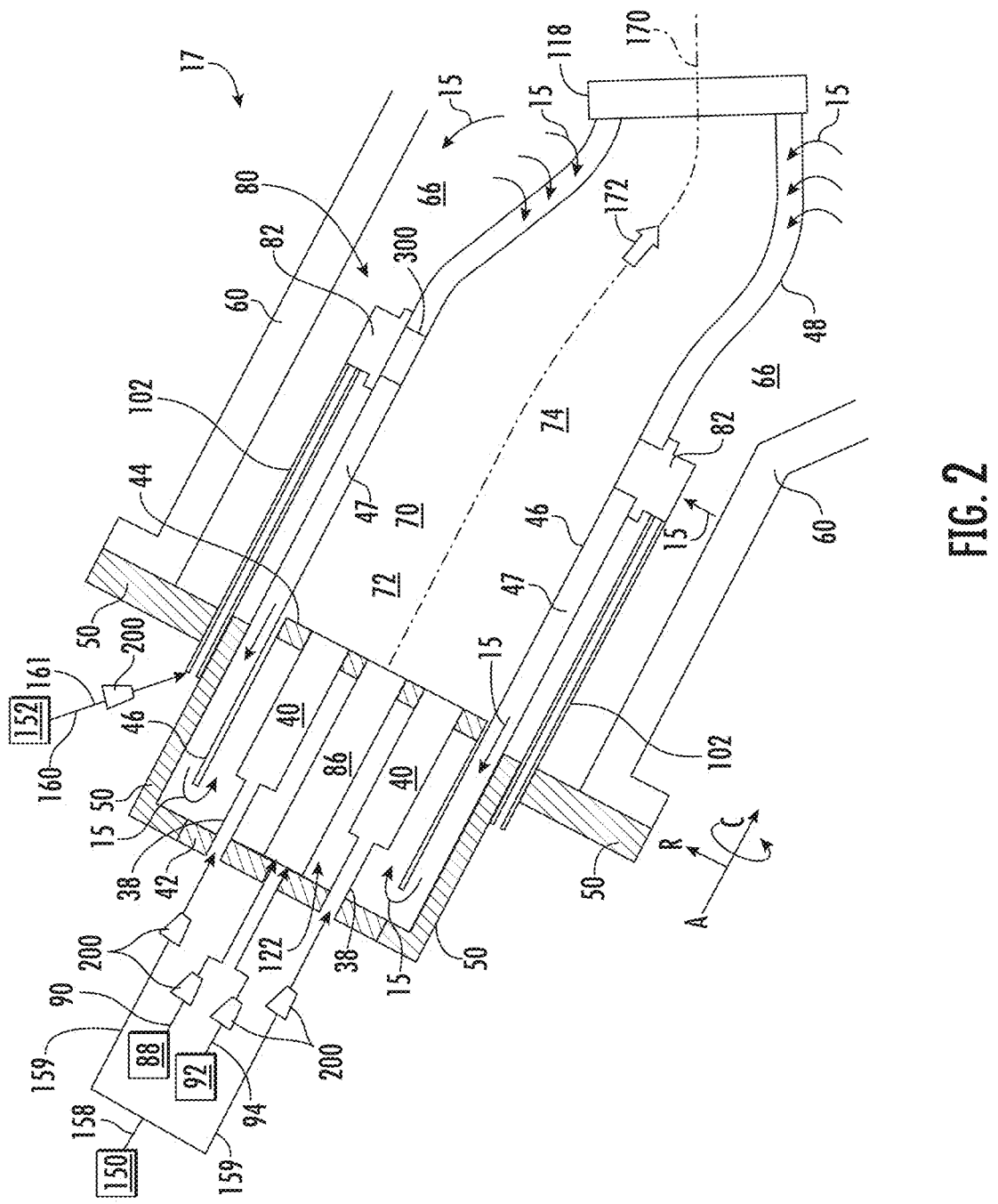
FIG. 2 schematically illustrates a cross-sectional view of a combustor in accordance with embodiments of the present disclosure, as may be used with the turbomachine of FIG. 1.

FIG. 2 is a schematic representation of a combustor 17, as may be included in a can-annular arrangement of combustion section 16 for the gas turbine engine 10. In a can annular combustion system, a plurality of combustors 17 (e.g., 8, 10, 12, 14, 16, or more) are positioned in an annular array about the shaft 22 that connects the compressor section 14 to the turbine section 18.

As shown in FIG. 2, the combustor 17 may define an axial direction A that extends along an axial centerline 170. The combustor may also define a circumferential direction C which extends around the axial direction A and the axial centerline 170. The combustor 17 may further define a radial direction R perpendicular to the axial direction A and the axial centerline 170.

As shown in FIG. 2, the combustor 17 includes a combustion liner 46 that defines a combustion chamber 70. The combustion liner 46 may be positioned within (i.e., circumferentially surrounded by) an outer sleeve 48, such that an annulus 47 is formed therebetween. The combustion liner 46 may contain and convey combustion gases to the turbine section 18. The combustion liner 46 defines the combustion chamber 70 within which combustion occurs. As shown in FIG. 2, the combustion liner 46 may extend between fuel nozzles 40 and an aft frame 118. The combustion liner 46 may have a generally cylindrical liner portion and a tapered transition portion that is separate from the generally cylindrical liner portion, as in many conventional combustion systems. Alternately, the combustion liner 46 may have a unified body (or "unibody") construction, in which the generally cylindrical portion and the tapered portion are integrated with one another. Thus, any discussion of the combustion liner 46 herein is intended to encompass both conventional combustion systems having a separate liner and transition piece and those combustion systems having a unibody liner. Moreover, the present disclosure is equally applicable to those combustion systems in which the transition piece and the stage one nozzle of the turbine section 18 are integrated into a single unit (e.g., without aft frame 118), sometimes referred to as a "transition nozzle" or an "integrated exit piece."

FIG. 2 illustrates a combustor 17 having both fuel nozzles 40 and one or more fuel injection assemblies 80 (also referred to as an axial fuel staging (AFS) system), as discussed further herein. The at least one fuel nozzle 40 may be positioned at the forward end of the combustor 17. Fuel may be directed through fuel supply conduits 38, which extend through an end cover 42, and into the fuel nozzles 40. The fuel nozzles 40 convey the fuel and compressed air 15 into a primary combustion zone 72, where combustion occurs. In some embodiments, the fuel and compressed air 15 are combined as a mixture prior to reaching the primary combustion zone 72.

The combustion liner 46 may be surrounded by an outer sleeve 48, which is spaced radially outward of the combustion liner 46 to define an annulus 47 through which compressed air 15 flows to a forward, or head, end of the combustor 17. For example, compressed air 15 may enter the annulus 47 through the outer sleeve 48 (e.g., through impingement holes proximate the aft frame 118) and travel towards the end cover 42, such that the compressed air 15 within the annulus 47 flows opposite the direction of combustion gases 172 (34 in FIG. 1) within the combustion liner 46. Heat is transferred convectively from the combustion liner 46 to the compressed air 15, thus cooling the combustion liner 46 and warming the compressed air 15.

In some embodiments, the outer sleeve 48 may include a flow sleeve and an impingement sleeve coupled to one another. The flow sleeve may be disposed at the forward end, and the impingement sleeve may be disposed at the aft end. Alternately, the outer sleeve 48 may have a unified body (or "unisleeve") construction, in which the flow sleeve and the impingement sleeve are integrated with one another in the axial direction. As before, any discussion of the outer sleeve 48 herein is intended to encompass both conventional combustion systems having a separate flow sleeve and impingement sleeve and combustion systems having a unisleeve outer sleeve.

The forward casing 50 and the end cover 42 of the combustor 17 define the head end air plenum 122, which includes the one or more fuel nozzles 40. The fuel nozzles 40 may be any type of fuel nozzle, such as bundled tube fuel nozzles (often referred to as "micromixers") or swirler nozzles (often referred to as "swozzles"). One or more of the fuel nozzles 40 may include a liquid fuel lance 86 (discussed further below). The fuel nozzles 40 may be positioned within the head end air plenum 122 defined at least partially by the forward casing 50. In many embodiments, the fuel nozzles 40 may extend from the end cover 42. For example, each fuel nozzle 40 may be coupled to an aft surface of the end cover 42 via a flange (not shown). As shown in FIG. 2, the at least one fuel nozzle 40 may be partially surrounded by the combustion liner 46 or a cylindrical inlet flow conditioner (not separately labeled). The aft, or downstream ends, of the fuel nozzles 40 extend through or collectively define a cap plate 44 that defines the upstream end of the combustion chamber 70.

The fuel nozzles 40 may be in fluid communication with a first fuel supply 150 configured to supply a first fuel 158 to the fuel nozzles 40 via one or more fuel nozzle supply lines 159. In many embodiments, the first fuel 158 may be a fuel mixture containing natural gas (such as one or more of methane, ethane, propane, or other suitable natural gas) and hydrogen. In other embodiments, the first fuel 158 may be pure natural gas or pure hydrogen (e.g., 100% hydrogen, which may or may not contain some trace amount of contaminants), such that the first fuel is not a mixture of multiple fuels. In other embodiments, the first fuel 158 may be a mixture of hydrogen and natural gas, where hydrogen is the majority component (e.g., greater than 50%). In exemplary embodiments, the first fuel 158 and compressed air 15 may mix together within the fuel nozzles 40 to form a first mixture of compressed air 15 and the first fuel 158 before being ejected (or injected) by the fuel nozzles 40 into the primary combustion zone 72.

The forward casing 50 may be fluidly and mechanically connected to a compressor discharge casing 60, which defines a high pressure plenum 66 around the combustion liner 46 and the outer sleeve 48. Compressed air 15 from the compressor section 14 travels through the high pressure plenum 66 and enters the combustor 17 via apertures (not shown) in the downstream end of the outer sleeve 48 (as indicated by arrows near the aft frame 118). Compressed air 15 travels upstream through the annulus 47 and is turned by the end cover 42 to enter the fuel nozzles 40 and to cool the head end. In particular, compressed air 15 flows from high pressure plenum 66 into the annulus 47 at an aft end of the combustor 17, via openings defined in the outer sleeve 48. The compressed air 15 travels upstream from the aft end of the combustor 17 to the head end air plenum 122, where the compressed air 15 reverses direction and enters the fuel nozzles 40.

In the exemplary embodiment, one or more fuel injection assemblies 80 are provided to deliver a second fuel/air mixture to a secondary combustion zone 74 downstream from the primary combustion zone 72. For example, a second flow of fuel 152 and air 15 may be introduced by one or more fuel injectors 82 to the secondary combustion zone 74. The one or more fuel injectors 82 are mounted to combustion liner 46 and/or outer sleeve 48 at an axial position downstream of the primary combustion zone 72 and upstream of aft frame 118.

The primary combustion zone 72 and the secondary combustion zone 74 may each be portions of the combustion chamber 70 and therefore may be defined by the combustion liner 46. For example, the primary combustion zone 72 may be defined from an outlet of the fuel nozzles 40 to the fuel injector 82, and the secondary combustion zone 74 may be defined from the fuel injector 82 to the aft frame 118. In this arrangement, the forwardmost boundary of the fuel injector 82 may define the end of the primary combustion zone 72 and the beginning of the secondary combustion zone 74 (e.g., at an axial location where a second flow of fuel and air are introduced).

Such a combustion system having axially separated combustion zones is described as an "axial fuel staging" (AFS) system. The fuel injection assemblies 80 may be circumferentially spaced apart from one another on the outer sleeve 48 (e.g., equally spaced apart in some embodiments). In many embodiments, the combustor 17 may include four fuel injection assemblies 80 spaced apart from one another and configured to inject a second mixture of fuel and air into a secondary combustion zone 74 via each respective fuel injector 82. In other embodiments, the combustor 17 may include any number of fuel injection assemblies 80 (e.g., 1, 2, 3, or up to 10) in one or more axial stages.

A fuel supply conduit 102 may fluidly couple to the fuel injector 82. The fuel injector 82 may be in fluid communication with a second fuel supply 152 configured to supply a second fuel 160 to the fuel injector 82 via a fuel injector supply line 161 and/or the fuel supply conduit 102. The second fuel supply 152 may be the same or different than the first fuel supply 150, such that the fuel injector 82 may be supplied with the same fuel or a different fuel than the fuel nozzles 40. In many embodiments, the second fuel 160 may be a fuel mixture containing natural gas (such as one or more of methane, ethane, propane, or other suitable natural gas) and hydrogen. In other embodiments, the second fuel 160 may be pure natural gas or pure hydrogen (e.g., 100% hydrogen, which may or may not contain some trace amount of contaminants), such that the first fuel is not a mixture of multiple fuels. In other embodiments, the second fuel 160 may be a mixture of hydrogen and natural gas, where hydrogen is the majority component (i.e., greater than 50%). In exemplary embodiments, the second fuel 160 and compressed air 15 may mix together within the fuel injector 82 to form a mixture of compressed air 15 and the second fuel 160 before being injected into the combustion chamber 70 and, more specifically, into the secondary combustion zone 74.

In many embodiments, the combustor 17 may further include a fuel lance 86, which may extend along the axial centerline 170 and which may be positioned within one of the one or more fuel nozzles 40. The fuel lance 86 may provide a liquid fuel or a mixture of liquid fuel and water to the combustion chamber 70. As such, the fuel lance 86 may be fluidly connected to a liquid fuel supply 88 via a liquid fuel supply line 90. Additionally, the fuel lance 86 may be fluidly connected to a water supply 92 via a water supply line 94.

One or more filters 200 may be disposed in fluid communication with the various fluid supply lines (such as the lines 90, 94, 159, 161) for removing particulates from the fluid traveling through the respective fluid supply line. For example, as shown, a filter 200 may be disposed in fluid communication with each of the liquid fuel supply line 90, the water supply line 94, the fuel nozzle supply line(s) 159, and/or the fuel injector supply line(s) 161.

Figure 3:
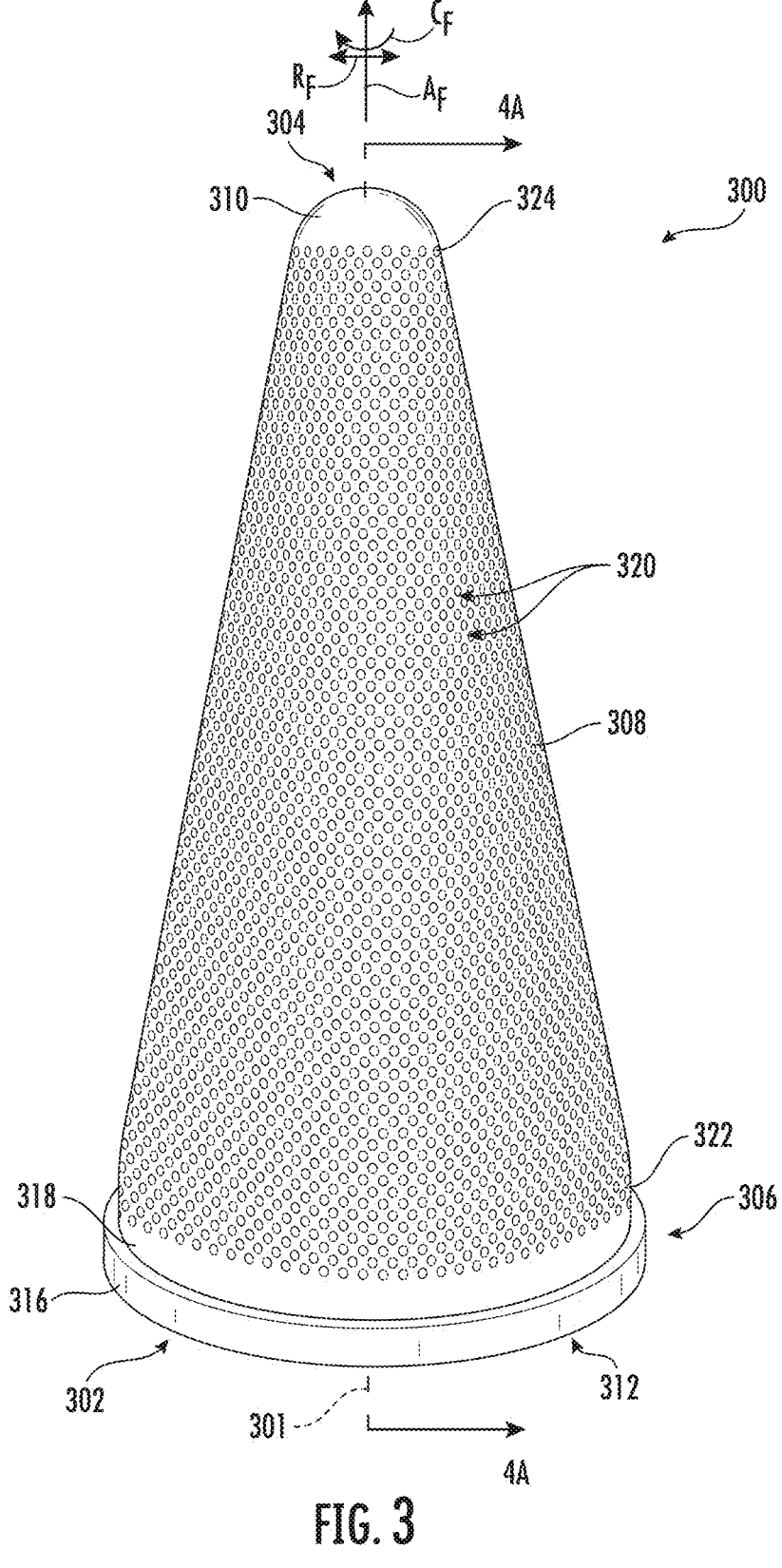
FIG. 3 illustrates a perspective view of a filter in accordance with embodiments of the present disclosure.
Figures 4A, 4B:
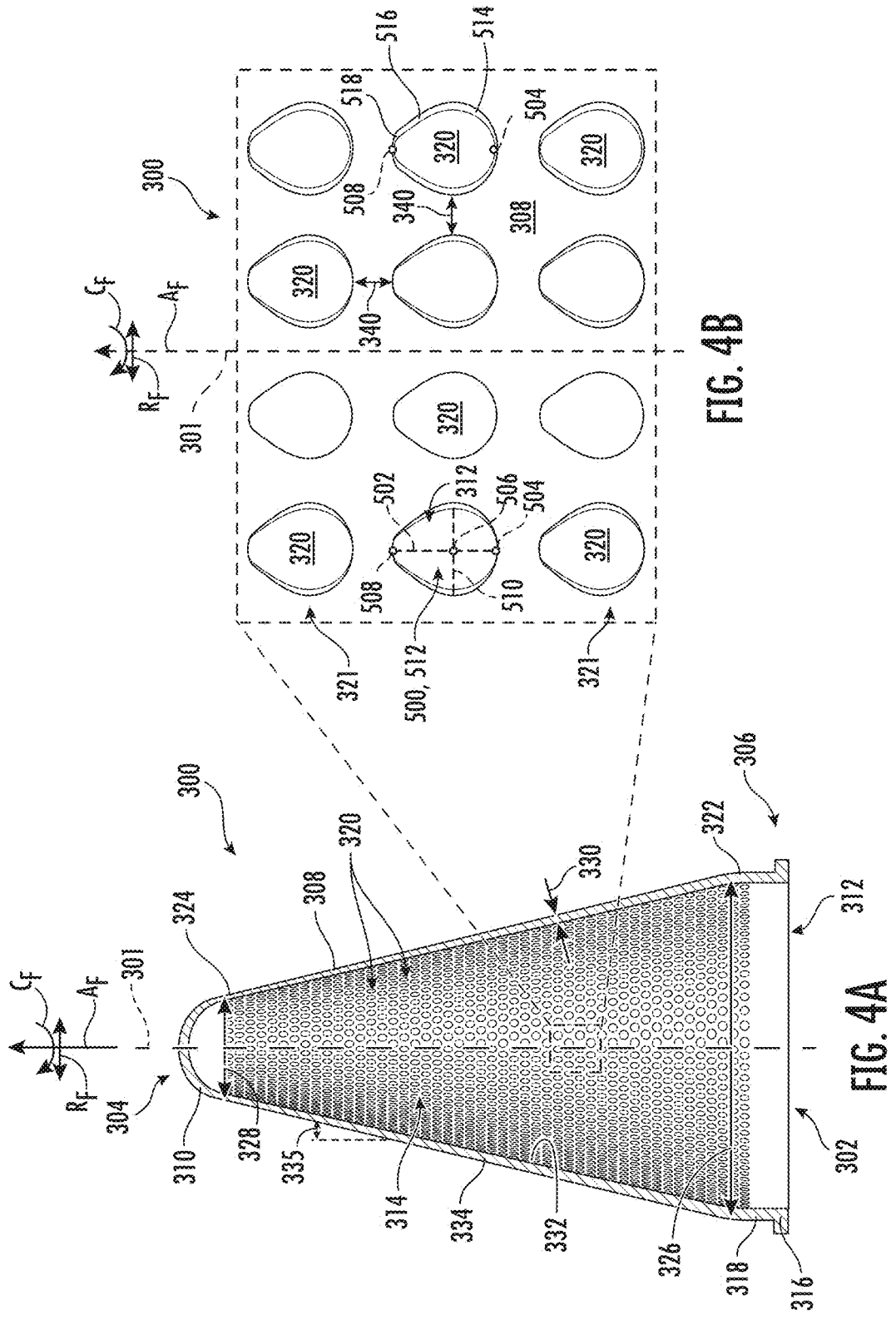
FIG. 4A illustrates a cross-sectional view of the filter shown in FIG. 3 from along the line 4A-4A in accordance with embodiments of the present disclosure.
FIG. 4B illustrates an enlarged view of the detail outlined in phantom shown in FIG. 4A in accordance with exemplary aspects of the present disclosure.

Referring now to FIGS. 3, 4A, and 4B, various views of a filter 300 for removing particulates (e.g., debris) from a fluid provided to a combustor (such as the combustor 17 described above with reference to FIG. 2) are illustrated in accordance with embodiments of the present disclosure. The filter 300 may be representative of one or more of the filters 200 described above with reference to FIG. 2. Particularly, FIG. 3 illustrates a perspective side view of the filter 300, FIG. 4A illustrates a cross-sectional view of the filter 300 from along the line 4A-4A shown in FIG. 3, and FIG. 4B is an enlarged view of a portion of the filter 300 outlined in phantom in FIG. 4A.

As shown, the filter 300 may extend along a center axis 301 from a forward end 302 to an aft end 304. The filter 300 may define a cylindrical coordinate system having an axial direction $A_F$ extending along the center axis 301, a radial direction $R_F$ orthogonal (or perpendicular) to the center axis 301 and the axial direction $A_F$, and a circumferential direction $C_F$ extending about the center axis 301 and the axial direction $A_F$.

The filter 300 may include a base flange 306, a filter screen 308, and a downstream segment 310 that collectively define an interior 314 of the filter 300. The base flange 306 may extend (e.g., axially) from the forward end 302 to the filter screen 308. The base flange 306 may be annular such that the base flange 306 surrounds (circumferentially) the center axis 301. The base flange 306 may define an open base 312 at the forward end 302 for receiving a fluid (e.g., an unfiltered fluid) into the interior 314 of the filter 300. The base flange 306 may include a lip portion 316 and an axial portion 318. The lip portion 316 may protrude radially from the axial portion 318 such that a stepped surface is defined at the intersection of the lip portion 316 and the axial portion 318. In operation, the lip portion 316 may be seated or positioned against a corresponding lip or protrusion within a fluid conduit to couple the filter 300 to the fluid conduit for filtering particulates within a fluid that may be conveyed through the fluid conduit. The base flange 306 may be solid, such that no apertures or holes are defined in the base flange 306.

The filter screen 308 may extend between the base flange 306 and the downstream segment 310. That is, the filter screen 308 may extend (e.g., axially) from the base flange 306 to the downstream segment 310. The filter screen 308 may define a portion of the interior 314, and the filter screen 308 may be annular such that the filter screen 308 surrounds the center axis 301. The filter screen 308 may define a plurality of apertures 320 having a non-circular shape that are sized to permit fluid to pass from the interior 314 while preventing particulates from passing from the interior 314. In exemplary embodiments, the plurality of apertures 320 may be arranged uniformly (e.g., in a pattern or equal distribution) on the filter screen 308, such that each aperture 320 may be equally spaced apart from neighboring apertures 320. However, in other embodiments, the plurality of apertures 320 may be arranged non-uniformly (e.g., not in a pattern or otherwise randomly distributed) on the filter screen 308.

As shown in FIGS. 3 and 4A, the filter screen 308 may be shaped as a conical segment (e.g., a hollow conical segment) extending about the center axis 301 from a base end 322 at the base flange 306 to a tip end 324 at the downstream segment 310. Specifically, the filter screen 308 may extend from the base end 322 at the axial portion 318 of the base flange 306. The base end 322 of the filter screen 308 may define a base diameter 326, and the tip end 324 may define a tip diameter 328. The base diameter 326 may be larger than the tip diameter 328 (such as about 150% larger and about 500% larger, or such as about 200% larger and about 400% larger). In exemplary embodiments, the base diameter 326 may be in the range of about 0.65 inches to about 2.5 inches, and the finished height from lip portion 316 to aft end 304 may be in the range of about 0.8 inches to about 4.5 inches. Further, the filter screen 308 may be formed from a thin wall structure that defines a thickness 330 between an interior surface 332 of the filter screen 308 and an exterior surface 334 of the filter screen 308. The thickness 330 may be uniform (e.g., constant) between the base end 322 and the tip end 324. In many embodiments, the thickness 330 of the "thin wall" structure may be between about 0.02 inches and about 0.09 inches, or such as between about 0.03 inches and about 0.08 inches, or such as between about 0.03 inches and about 0.05 inches. In this instance, the term "about" refers to a variation of +/−0.005 inches. Alternatively, or additionally, the term "thin wall" may refer to a structure having a ratio of thickness to diameter of between about 1:50 and about 1:1000, or such as between about 1:100 and about 1:1000.

The plurality of apertures 320 may each extend through the filter screen 308 (e.g., from the interior surface 332 to the exterior surface 334). The filter screen 308 may include a plurality of apertures 320, ranging in number from about 200 apertures to about 9,500 apertures and resulting in a nominal flow area between about 0.09 square inches and about 3.2 square inches (at a pressure ratio of 1.05). As will be discussed further below, the apertures 320 have a maximum diameter ranging between about 0.015 inches and about 0.070 inches, or between about 0.020 inches and about 0.055 inches, or between about 0.025 inches and about 0.035 inches.

In exemplary embodiments, the filter screen 308 may converge linearly in diameter as the filter screen extends from the base end 322 to the tip end 324. As used herein, "converges linearly," "converging linearly," and cognates thereof, when used in the context of a cone or cone segment, may be used to describe that the diameter of the cone or cone segment decreases at a constant rate as the cone or cone segment extends axially from a first end (e.g., the base end 322) to a second end (e.g., the tip end 324), such that a side profile of the cone segment is a straight line in an axial-radial plane (as shown in FIG. 4A).

As shown in FIG. 4A, a cone angle 335 may be defined between an outer surface 334 of the filter screen 300 and a line parallel to the center axis 301 in an axial-radial plane (e.g., as shown in FIG. 4A). The angle 335 may be between about 10 degrees and about 60 degrees, or such as between about 14 degrees and about 32 degrees, or such as between about 17 degrees and about 26 degrees, or such as between about 20 degrees and about 24 degrees.

A ratio between the angle 335 and the thickness 330 may be between about 5 degrees (deg)/inches (in) and about 80 deg/in, or such as between about 10 deg/in and about 40 deg/in. This ratio may advantageously permit the filter 300 to be integrally formed using an additive manufacturing system (such as the additive manufacturing system 1000 described hereinbelow) without causing defects to the filter 300. For example, if the thickness 330 were too small or the angle 335 were too large, the filter 300 may collapse during the additive manufacturing process.

The downstream segment 310 may extend (e.g., axially) from the tip end 324 of the filter screen 308 to the aft end 304 of the filter 300. The downstream segment 310 may partially define the interior 314. The downstream segment 310 may not define any apertures, such that the downstream segment 310 is solid and does not permit fluid to pass therethrough. The downstream segment 310 may be at least partially annular such that the downstream segment 310 surrounds (circumferentially) the center axis 301. Particularly, the downstream segment 310 may extend from an open end at the tip end 324 to a closed end at the aft end 304 of the filter 300. During operation, contaminants (e.g., particulates)

from the fluid being filtered may collect in or be contained within the downstream segment 310.

As shown in FIG. 4B, the plurality of apertures 320 are defined through the filter segment 308 and include a non-circular shape 500. The non-circular shape 500 may be symmetrical about an axis of symmetry 502. Specifically, the non-circular shape 500 may only be symmetrical about a single axis of symmetry (e.g., the axis of symmetry 502), such that the non-circular shape 500 is not symmetrical about any other axis. The non-circular shape 500 may converge towards the axis of symmetry 502 as the non-circular shape extends towards the downstream segment 310 (e.g., along the axial direction $A_F$). As described below, when the filter 300 is being additively manufactured, the axial direction $A_F$ is the same as a build direction of the additive manufacturing system 1000, such that the non-circular shape 500 may converge towards the axis of symmetry 502 as the non-circular shape extends in the build direction of the additive manufacturing system 1000. This advantageously permits the plurality of apertures 320 to be fabricated using the additive manufacturing system without causing defects to the apertures 320. For example, the convergence avoids excessive material overhang during the additive manufacturing process, which occurs layer-by-layer in the build direction, thereby allowing for fabrication of the filter 300 having the plurality of apertures 320 of uniform dimensions.

More specifically, the non-circular shape 500 may extend (e.g., axially) between a forwardmost point 504 and an aftmost point 508, which may both be disposed on the axis of symmetry 502. The distance between the forwardmost point 504 and the aftmost point 508 is the height of the non-circular shape 500. Representative heights of the non-circular shape 500 range from about 0.020 inches to about 0.080 inches, or from about 0.025 inches to about 0.65 inches, or from about 0.030 inches to about 0.045 inches, or from about 0.035 inches to about 0.040 inches. Additionally, the non-circular shape 500 may define a center point 506 (which may be the geometric center point of the two-dimensional non-circular shape 500) that is also disposed on the axis of symmetry 502. A transverse axis 510 may be perpendicular to the axis of symmetry 502 and may extend through the center point 506. The non-circular shape 500 may diverge away from the axis of symmetry 502 as the non-circular shape extends in the axial direction $A_F$ from the forwardmost point 504 to the transverse axis 510. The non-circular shape 500 may converge towards the axis of symmetry 502 as the non-circular shape extends in the axial direction $A_F$ from the transverse axis 510 to the aftmost point 508.

As shown, in some embodiments, the non-circular shape 500 may be a teardrop shape 512 having a semi-circular bottom portion 514 having a first diameter, a semi-circular top portion 518 having a second diameter smaller than the first diameter, and a tapering portion 516 extending between the semi-circular bottom portion 514 and the semi-circular top portion 518. The semi-circular bottom portion 514 may extend between the forwardmost point 504 and the tapering portion 516 with the first diameter being defined along the transverse axis 510. The tapering portion 516 may extend from the semi-circular bottom portion 514 to the semi-circular top portion 518. The semi-circular top portion 518 may extend from the tapering portion 516 to the aftmost point 508. While the non-circular shape 500 is a teardrop shape 512 in exemplary embodiments, other shapes may be possible, and the present disclosure should not be limited to any particular shape of aperture 320 unless specifically recited in the claims. In some embodiments, the semi-circular top portion 518 may be omitted. The first diameter may be in the range of from about 0.015 inches to about 0.065 inches, or from about 0.019 inches to about 0.054 inches, or from about 0.24 inches to about 0.035 inches. The second diameter may be in the range of from about 0.009 inches to about 0.0020 inches, or from about 0.010 inches to about 0.017 inches, or from about 0.012 inches to about 0.015 inches.

Figure 4C:
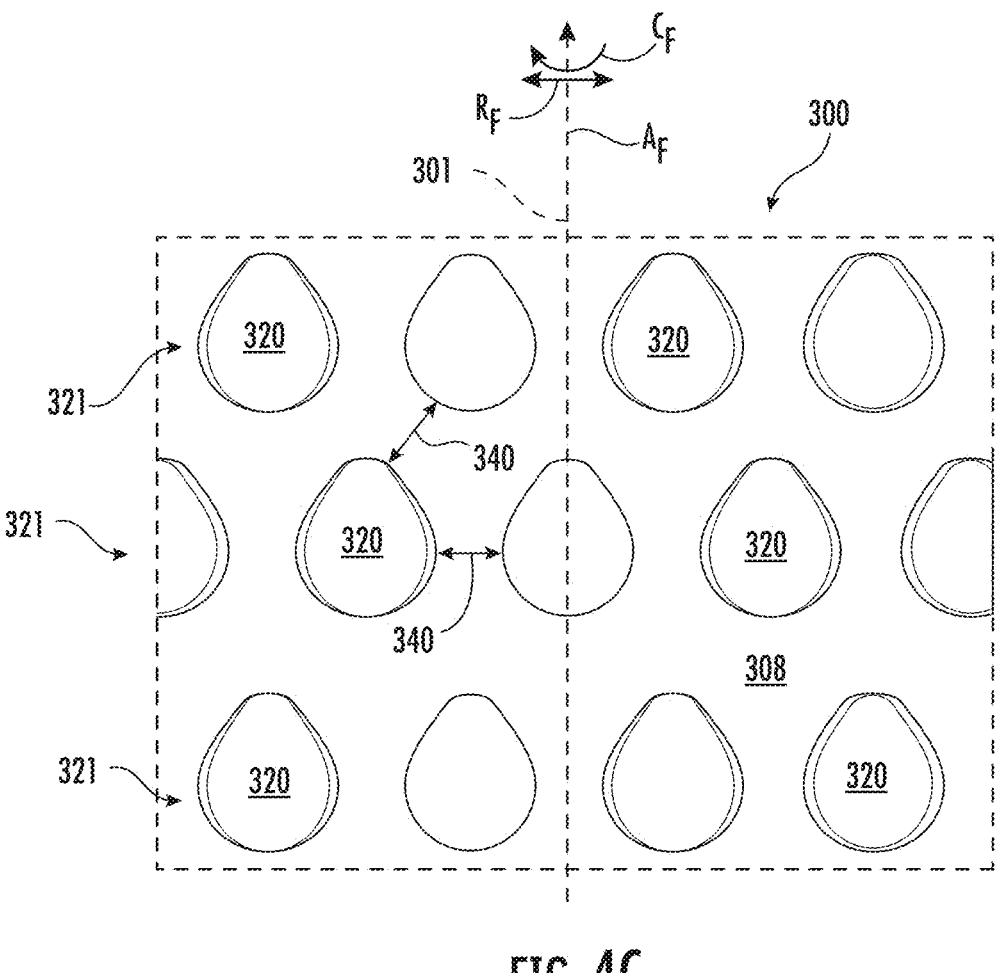
FIG. 4C illustrates an enlarged view of the detail outlined in phantom shown in FIG. 4A in accordance with exemplary aspects of the present disclosure.

The plurality of apertures 320 may be arranged in a plurality of rows 321. As shown in FIG. 4B, each aperture 320 in the row 321 may align both axially and circumferentially with an aperture in a neighboring row 321. The apertures 320 in each row 321 may be equally spaced apart (e.g., circumferentially) from neighboring apertures 320 in the same row 321. Additionally, the apertures 320 may be equally spaced apart (e.g., axially) from neighboring apertures 320 in neighboring rows 321. Alternatively, as shown in FIG. 4C, one or more rows 321 may be staggered circumferentially relative to a neighboring row 321. For example, as shown, the one or more rows 321 may be offset circumferentially relative to the neighboring rows 321 by half the distance between two apertures 320, such that the apertures 320 in the staggered row are positioned circumferentially between the apertures 320 in the neighboring rows 321. The staggered arrangement shown in FIG. 4C may allow for closer aperture-to-aperture spacing 340, which may advantageously allow for more apertures to be additively manufactured on the filter segment 308 without causing any printing defects.

The aperture-to-aperture spacing 340 is important because it is advantageous for the filter segment 308 to include as many apertures 320 as possible (for increased filtering capacity). However, the spacing between the apertures 320 must be large enough to support additive manufacturing of the filter segment 308 without causing a collapse of the filter segment 308 under its own weight. In exemplary embodiments, the aperture-to-aperture spacing 340 may be between about 0.01 inches and about 0.02 inches, or such as between about 0.012 inches and about 0.018 inches, or such as between about 0.014 inches and about 0.016 inches, or such as about 0.015 inches. The aperture-to-aperture spacing may be the shortest distance along the filter segment 308 between two apertures 320 (either in the same row 321 and/or in neighboring rows 321).

Figure 5:
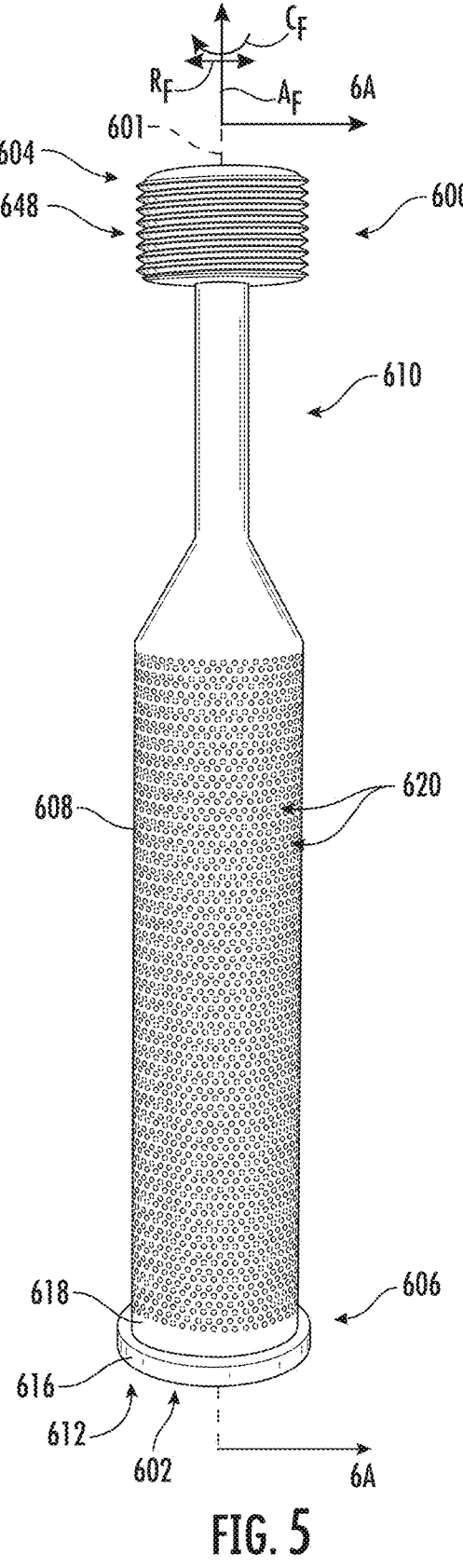
FIG. 5 illustrates a perspective view of a filter in accordance with embodiments of the present disclosure.
Figures 6A, 6B:
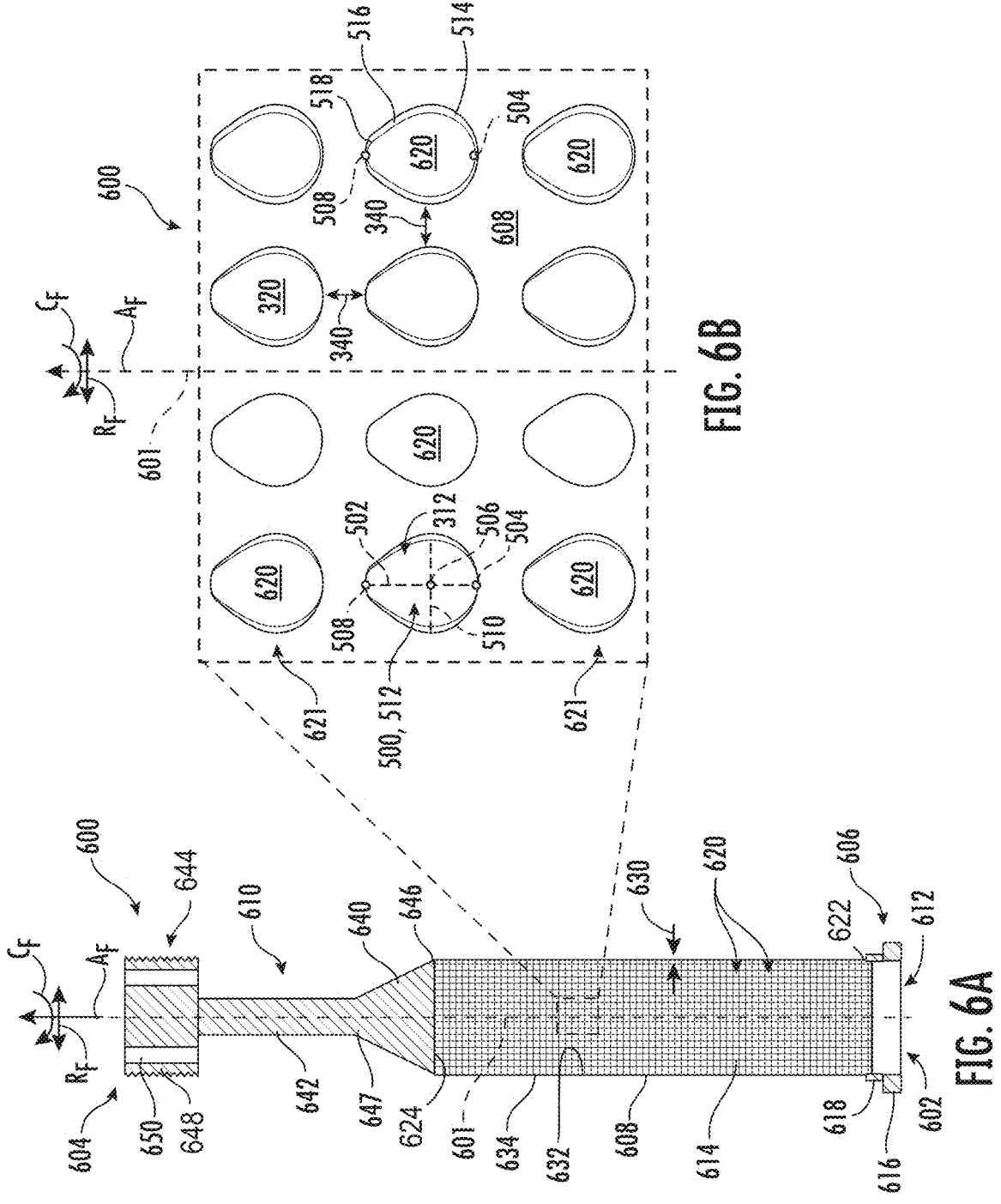
FIG. 6A illustrates a cross-sectional view of the filter shown in FIG. 5 from along the line 6A-6A in accordance with embodiments of the present disclosure.
FIG. 6B illustrates an enlarged view of the detail outlined in phantom shown in FIG. 6A in accordance with exemplary aspects of the present disclosure.

Referring now to FIGS. 5, 6A, and 6B, various views of a filter 600 for removing particulates (e.g., debris) from a fluid provided to a combustor (such as the combustor 17 described above with reference to FIG. 2) are illustrated in accordance with embodiments of the present disclosure. The filter 600 may be representative of one or more of the filters 200 described above with reference to FIG. 2. Particularly, FIG. 6 illustrates a side perspective view of the filter 600, FIG. 6A illustrates a cross-sectional view of the filter 600 from along the line 6A-6A shown in FIG. 5, and FIG. 6B is an enlarged view of a portion of the filter 600 outlined in phantom in FIG. 6A.

As shown, the filter 600 may extend along a center axis 601 from a forward end 602 to an aft end 604. The filter 600 may define a cylindrical coordinate system having an axial direction $A_F$ extending along the center axis 601, a radial direction $R_F$ orthogonal (or perpendicular) to the center axis 601 and the axial direction $A_F$, and a circumferential direction $C_F$ extending about the center axis 601 and the axial direction $A_F$.

The filter 600 may include a base flange 606, a filter screen 608, and a downstream segment 610 that collectively define an interior 614 of the filter 600. The base flange 606 may extend (e.g., axially) from the forward end 602 to the filter screen 608. The base flange 606 may be annular such that the base flange 606 surrounds (circumferentially) the center axis 601. The base flange 606 may define an open base 612 at the forward end 602 for receiving a fluid (e.g., an unfiltered fluid) into the interior 614 of the filter 600. The base flange 606 may include a lip portion 616 and an axial portion 618. The lip portion 616 may protrude radially from the axial portion 618 such that a stepped surface is defined at the intersection of the lip portion 616 and the axial portion 618. In operation, the lip portion 616 may be seated or positioned against a corresponding lip or protrusion within a fluid conduit to couple the filter 600 to the fluid conduit for filtering particulates within a fluid that may be conveyed through the fluid conduit. The base flange 606 may be solid, such that no apertures or holes are defined in the base flange 606.

The filter screen 608 may extend between the base flange 606 and the downstream segment 610. That is, the filter screen 608 may extend (e.g., axially) from the base flange 606 to the downstream segment 610 and may have a length of about 4.125 inches+/−0.015 inches and an inner diameter of about 0.920 inches. The filter screen 608 may define a portion of the interior 614, and the filter screen 608 may be annular such that the filter screen 608 surrounds the center axis 601.

The filter screen 608 may define a plurality of apertures 620 having a non-circular shape, as discussed above, that are sized to permit fluid to pass from the interior 614 and to prevent particulates from passing from the interior 614. In exemplary embodiments, the plurality of apertures 620 may be arranged uniformly (e.g., in a pattern or equal distribution) on the filter screen 608, such that each aperture 620 may be equally spaced apart from neighboring apertures 620. However, in other embodiments, the plurality of apertures 620 may be arranged non-uniformly (e.g., not in a pattern or otherwise randomly distributed) on the filter screen 608. Additive manufacturing facilitates readily customizable distributions of the plurality of apertures 620.

As shown in FIG. 6A, the filter screen 608 may have a thin wall structure that defines a thickness 630 between an interior surface 632 of the filter screen 608 and an exterior surface 634 of the filter screen 608. The thickness 630 may be uniform (e.g., constant) along an axial length of the filter screen 608, that is, between the base end 622 and the tip end 624. The thickness 630 may be as described above, and, by way of example and not limitation, the thickness 630 of the filter screen 608 may be 0.040 inches. The plurality of apertures 620 may each extend through the filter screen 608 (e.g., from the interior surface 632 to the exterior surface 634). By way of example and not limitation, the filter screen 608 may include about 5,000 apertures 620, each aperture 620 having a height of about 0.037 inches, a first diameter of about 0.031 inches and a second diameter of about 0.017 inches, resulting in a nominal flow area of 0.66 square inches (at a pressure ratio of 1.05).

The downstream segment 610 may extend (e.g., axially) from the tip end 624 of the filter screen 608 to the aft end 604 of the filter 600. Particularly, the downstream segment 610 may include a tapering segment 640, an orifice fitting 644, and a solid neck 642 connecting the tapering segment 640 and the orifice fitting 644. The tapering segment 640 may be solid. The tapering segment 640 may be shaped as a solid conical segment that converges linearly in diameter as the tapering segment 640 extends axially from a first end 646 at the filter screen 608 to a second end 647 at the solid neck

642. The solid neck 642 may extend (e.g., axially) between the tapering segment 640 and the orifice fitting 644. The solid neck 642 may be shaped as a cylinder in many embodiments. The tapering segment 640 and the solid neck 642 may have a representative length of about 2.030 inches.

The orifice fitting 644 may extend (e.g., axially) from the solid neck 642 to the aft end 604. In one representative embodiment, the orifice fitting 644 may have a length of from about 0.50 inches and about 0.630 inches and a diameter of about 1.06 inches. The orifice fitting 644 may define external threads 648 for threadably coupling the filter 600 to internal threads of a fluid carrying conduit. The orifice fitting 644 may define one or more orifice passages 650 that allow for filtered fluid to pass therethrough. For example, during operation, unfiltered fluid may enter the interior of the filter 600 and be forced through the apertures 620 (where debris is removed from the fluid). The filtered fluid then passes through the orifice passages 650 of the orifice fitting 644. The orifice passages 650, which may be parallel to the center axis 601, meter the flow of fluid through the filter 600.

As shown in FIG. 6B, the plurality of apertures 620 are defined through the filter segment 608 and include a non-circular shape 500. The non-circular shape 500 may be symmetrical about an axis of symmetry 502. Specifically, the non-circular shape 500 may only be symmetrical about a single axis of symmetry (e.g., the axis of symmetry 502), such that the non-circular shape 500 is not symmetrical about any other axis. The non-circular shape 500 may converge towards the axis of symmetry 502 as the non-circular shape extends towards the downstream segment 610 (e.g., along the axial direction $A_F$). As described below, when the filter 600 is being additively manufactured, the axial direction $A_F$ is the same as a build direction of the additive manufacturing system 1000, such that the non-circular shape 500 may converge towards the axis of symmetry 502 as the non-circular shape extends in the build direction of the additive manufacturing system 1000. This advantageously permits the plurality of apertures 620 to be fabricated using the additive manufacturing system without causing defects to the apertures 620. For example, the convergence avoids excessive material overhang during the additive manufacturing process, which occurs layer-by-layer in the build direction, thereby allowing for fabrication of the filter 600 having the plurality of apertures 620.

More specifically, the non-circular shape 500 may extend (e.g., axially) between a forwardmost point 504 and an aftmost point 508, which may both be disposed on the axis of symmetry 502. Additionally, the non-circular shape 500 may define a center point 506 (which may be the geometric center point of the two-dimensional non-circular shape 500) that is also disposed on the axis of symmetry 502. A transverse axis 510 may be perpendicular to the axis of symmetry 502 and may extend through the center point 506. The non-circular shape 500 may diverge away from the axis of symmetry 502 as the non-circular shape extends in the axial direction $A_F$ from the forwardmost point 504 to the transverse axis 510. The non-circular shape 500 may converge towards the axis of symmetry 502 as the non-circular shape extends in the axial direction $A_F$ from the transverse axis 510 to the aftmost point 508.

As shown, in some embodiments, the non-circular shape 500 may be a teardrop shape 512 having a semi-circular bottom portion 514, a semi-circular top portion 518, and a tapering portion 516 extending between the semi-circular bottom portion 514 and the semi-circular top portion 518. The semi-circular bottom portion 514 may extend between the forwardmost point 504 and the tapering portion 516. The tapering portion 516 may extend from the semi-circular bottom portion 514 and the semi-circular top portion 518. The semi-circular top portion 518 may extend from the tapering portion 516 to the aftmost point 508. While the non-circular shape 500 is a teardrop shape 512 in exemplary embodiments, other shapes may be possible, and the present disclosure should not be limited to any particular shape of aperture 620 unless specifically recited in the claims. In some embodiments, the semi-circular top portion 518 may be omitted.

The plurality of apertures 620 may be arranged in a plurality of rows 621. Each aperture 620 in the row 621 may align axially with an aperture in a neighboring row 621. The apertures 620 in each row 621 may be equally spaced apart (e.g., circumferentially) from neighboring apertures 620 in the same row 621 by a prescribed aperture-to-aperture spacing 340. Each row 621 may be axially spaced apart from at least one neighboring row 621.

Figures 7, 8, 9:
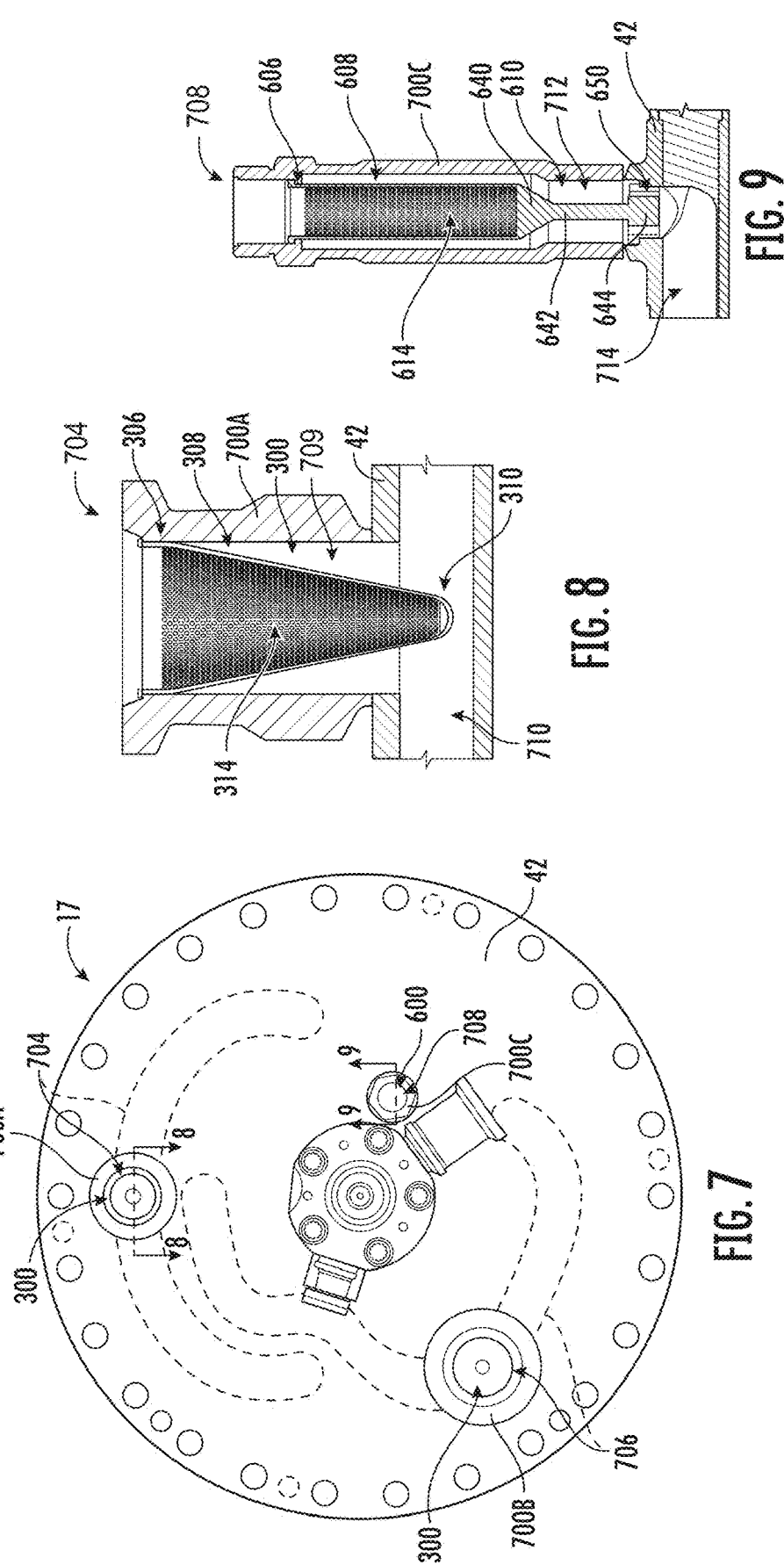
FIG. 7 illustrates a planar view of a combustor endcover in accordance with embodiments of the present disclosure.
FIG. 8 illustrates a cross-sectional view of the combustor endcover shown in FIG. 7 from along the line 8-8 in accordance with embodiments of the present disclosure.
FIG. 9 a cross-sectional view of the combustor endcover shown in FIG. 7 from along the line 9-9 in accordance with embodiments of the present disclosure.

Referring now to FIG. 7, a planar (forward-looking-aft) view of a combustor 17 is illustrated in accordance with embodiments of the present disclosure. As shown, the combustor 17 includes the end cover 42. One or more fluid conduits 700A, 700B, 700C may extend from, and couple to, the end cover 42. The one or more fluid conduits 700A, 700B, 700C and the end cover 42 may each define portions of a fluid (e.g., a fuel) supply circuit 704, 706, 708, which may be in fluid communication with the fuel nozzles 40 and/or the fuel lance 86 shown and described above with reference to FIG. 2. For example, a first fuel supply conduit 700A and the end cover 42 may partially define a first fuel supply circuit 704, which may be in fluid communication with a first group of fuel nozzles 40 (FIG. 2). Additionally, a second fuel supply conduit 700B and the end cover 42 may partially define a second fuel supply circuit 706, which may be in fluid communication with a second group of fuel nozzles 40 (FIG. 2) that is different than the first group of fuel nozzles. Lastly, a third fuel supply conduit 700C and the end cover 42 may partially define a third fuel supply circuit 706, which may be in fluid communication with a third group of fuel nozzles 40 (FIG. 2) and/or the fuel lance 86 (FIG. 2). In many embodiments, the first group and the second group of fuel nozzles 40 may be outer fuel nozzles that are radially spaced apart from an axial centerline of the combustor 17, and the third group of fuel nozzles 40 may be a single center fuel nozzle (and/or the fuel lance) that extends along an axial centerline of the combustor 17.

The filters 300, 600 may be disposed within the one or more fluid conduits 700A, 700B, 700C for filtering particulates from the fuel (or other fluid, such as water) passing therethrough. Particularly, as shown in FIG. 7, filters 300 may be disposed in the first fluid conduit 700A and the second fluid conduit 700B, and the filter 600 may be disposed in the third fluid conduit 700C.

Referring now to FIG. 8, a cross-sectional view of the combustor 17 from along the line 8-8 shown in FIG. 7 is illustrated in accordance with embodiments of the present disclosure. As shown, the first conduit 700A may be coupled to the end cover 42 (e.g., fixedly coupled via a weld joint or braze joint). The first conduit 700A and the end cover 42 may partially define the first fuel circuit 704. For example, the first fuel conduit 700A may define a passage 709, and the end cover 42 may define a channel 710 fluidly connected to the passage 709. The passage 709 and the channel 710 may define portions of the first fuel circuit 704. The filter 300 may be disposed within the first fuel circuit 704 and coupled to the first fuel conduit 700A. For example, as described above, the filter 300 may include the base flange 306, the filter screen 308, and the downstream segment 310 that collectively define the interior 314 of the filter 300. The base flange 306 may be coupled to (or in contact with) the first fuel conduit 700A. The filter screen 308 may extend through the passage 709 and into the channel 710.

The downstream segment 310 may be disposed entirely within the channel 710. The downstream segment 310 may not define any apertures, such that the downstream segment 310 is solid and does not permit fluid to pass therethrough. The downstream segment 310 may be shaped as a hollow semi-sphere. That is, the downstream segment 310 may be at least partially annular and may partially define the interior 314. During operation, unfiltered fluid may enter the interior 314 of the filter 300 and pass through the apertures, which are sized to permit fluid to pass therethrough and prevent particulates from leaving the interior 314. The filtered fluid may then travel through the first fuel circuit 704 to the first group of fuel nozzles. Contaminants (e.g., particulates) from the fluid being filtered may build up or collect in the downstream segment 310, which advantageously prevents blockage of the apertures 320. The second fuel circuit 706 with a respective filter 300 may be configured the same or similarly to the first fuel circuit 704 shown in FIG. 8.

Referring now to FIG. 9, a cross-sectional view of the combustor 17 from along the line 9-9 shown in FIG. 7 is illustrated in accordance with embodiments of the present disclosure. As shown, the third fluid (e.g., fuel) conduit 700C may be coupled to the end cover 42 (e.g., fixedly coupled via a weld joint or braze joint). The third fluid conduit 700C and the end cover 42 may partially define the third fuel circuit 708. For example, the third fuel conduit 700C may define a passage 712, and the end cover 42 may define a channel 714 fluidly connected to the passage 712. The passage 712 and the channel 714 may define portions of the third fuel circuit 708. The filter 600 may be disposed within the third fuel circuit 712 and coupled to both the third fuel conduit 700C and the end cover 42.

For example, as described above, the filter 600 may include the base flange 606, the filter screen 608, and the downstream segment 610 that collectively define the interior 614 of the filter 600. The downstream segment 610 may include a tapering segment 640, an orifice fitting 644, and a solid neck 642 extending between the tapering segment 640 and the orifice fitting 644. The base flange 606 may be coupled to (or in contact with) the third fluid conduit 700C. The orifice fitting 644 may be threadably coupled to the end cover 42. The orifice fitting 644 may define one or more orifice passages 650 that allow for filtered fluid to pass into the end cover 42. For example, during operation, unfiltered fluid may enter the interior of the filter 600 and be forced through the apertures (where debris is removed from the fluid). The filtered fluid then passes through the orifice passages 650 of the orifice fitting 644.

Figure 10:
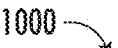
FIG. 10 is a schematic/block view of an additive manufacturing system for generating an object in accordance with embodiments of the present disclosure.

To illustrate an example of an additive manufacturing system and process, FIG. 10 shows a schematic/block view of an additive manufacturing system 1000 for generating an object 1220, such the filters 300, 600 described herein. FIG. 9 may represent an additive manufacturing system configured for direct metal laser sintering (DMLS) or direct metal laser melting (DMLM). The additive manufacturing system 1000 fabricates objects, such as the object 1220 (which may be representative of the filters 300, 600 described herein). For example, the object 1220 may be fabricated in a layer-by-layer manner along a build direction by sintering or melting a powder material (not shown) using an energy beam 1360 generated by a source such as a laser 1200. As shown, several filters 300, 600 may be additively manufactured simultaneously by the additive manufacturing system 1000. The powder to be melted by the energy beam is supplied by reservoir 1260 and spread evenly over a build plate 1002 using a recoater arm 1160 to maintain the powder at a level 1180 and to remove excess powder material extending above the powder level 1180 to waste container 1280. The recoater arm 1160 moves in a recoater direction 1340 to spread the powder over the build plate 1002. The energy beam 1360 sinters or melts a cross-sectional layer of the object 1220 being built under control of the galvo scanner 1320. The build plate 1002 is lowered (opposite the build direction), and another layer of powder is spread over the build plate and the object being built, followed by successive melting/sintering of the powder by the laser 1200. The process is repeated until the object 1220 is completely built up from the melted/sintered powder material.

The laser 1200 may be controlled by a computer system including a processor and a memory. The computer system may determine a scan pattern for each layer and control laser 1200 to irradiate the powder material according to the scan pattern. After fabrication of the object 1220 is complete, various post-processing procedures may be applied to the object 1220. Post-processing procedures include removal of excess powder by, for example, blowing or vacuuming. Other post-processing procedures include a stress release process.

Figure 11:
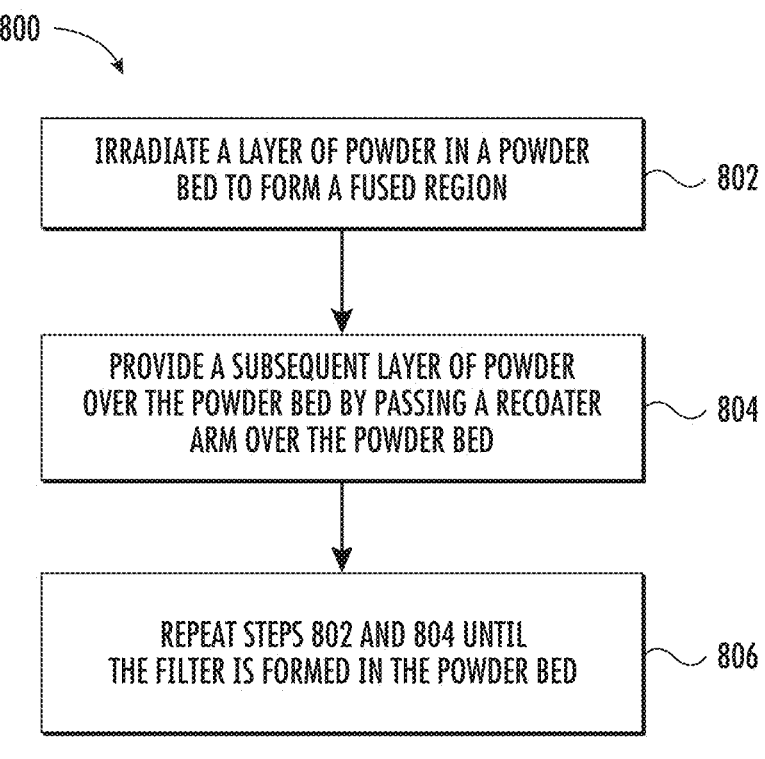
FIG. 11 is a flow chart of a method for fabricating a filter in accordance with embodiments of the present disclosure.

FIG. 11 is a flow chart of a sequential set of steps 802 through 806, which define a method 800 of fabricating a filter 300, 600 in accordance with embodiments of the present disclosure. The method 800 may be performed using an additive manufacturing system, such as the additive manufacturing system 1000 described herein or another suitable system. As shown in FIG. 11, the method 800 includes a step 802 of irradiating a layer of powder in a powder bed 1120 to form a fused region. In many embodiments, as shown in FIG. 10, the powder bed 1120 may be disposed on the build plate 1002, such that the fused region is fixedly attached to the build plate 1002. The method 800 may include a step 804 of providing a subsequent layer of powder over the powder bed 1120 of the powder bed 1120 (e.g., applied in the recoater direction 1340) by passing a recoater arm over the powder bed. The method 800 further includes a step 806 of repeating steps 802 and 804 until the filter 300, 600 is formed in the powder bed 1120.

When the filter 300, 600 is being additively manufactured, the axial direction $A_F$ is the same as a build direction of the additive manufacturing system 1000, such that the non-circular shape 500 of apertures 320, 620 may converge towards the axis of symmetry 502 as the non-circular shape 500 extends in the build direction of the additive manufacturing system 1000 (shown in FIG. 10). This advantageously permits the plurality of apertures 320, 620 to be fabricated using the additive manufacturing system 1000 without causing defects to the apertures 320, 620, despite their small size and large number of apertures 320, 620 per filter 300, 600. For example, the convergence avoids excessive material overhang during the additive manufacturing process, which occurs layer-by-layer in the build direction, thereby allowing for fabrication of the filter having the plurality of apertures 320, 620.

In many embodiments, the filters 300, 600 described herein may be integrally formed as a single component by using the additive manufacturing system 1000. That is, each of the subcomponents, e.g., the base flange 306, 606, the filter screen 308, 608, and the downstream segment 310, 610, and any other subcomponent of the filters 300, 600, may be manufactured together as a single body. In exemplary embodiments, this may be done by utilizing an additive manufacturing system and method, such as direct metal laser sintering (DMLS), direct metal laser melting (DMLM), or other suitable additive manufacturing techniques. In other embodiments, other manufacturing techniques, such as casting or other suitable techniques, may be used.

When utilizing additive manufacturing methods, the filters 300, 600 may be integrally formed as a single continuous piece of a metal alloy (such as a cobalt chrome alloy) and may thus include fewer sub-components and/or joints compared to prior designs. The integral formation of the filters 300, 600 through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A combustor for a gas turbine, the combustor comprising: a combustion liner that defines a combustion chamber; a fluid supply line for providing a fluid to the combustion chamber; a filter disposed in fluid communication with the fluid supply line for removing particulates from the fluid, the filter extending along a center axis from a forward end to an aft end, the filter comprising: a base flange defining an open base at the forward end; a downstream segment defining the aft end; and a filter screen comprising a thin wall extending between the base flange and the downstream segment, the filter screen defining an interior and a plurality of apertures having a non-circular shape sized to permit the fluid to pass from the interior and prevent particulates from passing from the interior.

The combustor as in any preceding clause, wherein the non-circular shape is symmetrical about an axis of symmetry.

The combustor as in any preceding clause, wherein the non-circular shape converges towards the axis of symmetry as the filter segment extends towards the downstream segment.

The combustor as in any preceding clause, wherein the non-circular shape is a teardrop shape having a semi-circular bottom portion, a semi-circular top portion, and a tapering portion extending between the semi-circular bottom portion and the semi-circular top portion.

The combustor as in any preceding clause, wherein the filter is integrally formed using an additive manufacturing system.

The combustor as in any preceding clause, wherein the filter screen is shaped as a conical segment extending from a base end at the base flange to a tip end at the downstream segment.

The combustor as in any preceding clause, wherein the base end defines a base diameter and the tip end defines a tip diameter, wherein the base diameter is larger than the tip diameter, and wherein the filter screen converges linearly in diameter as the filter screen extends from the base end to the tip end.

The combustor as in any preceding clause, wherein the downstream segment includes a tapering segment, an orifice fitting, and a solid neck extending from the tapering segment and the orifice fitting.

The combustor as in any preceding clause, wherein the filter screen defines a thickness, wherein an angle is defined between the center axis and the filter screen, and wherein a ratio between the angle and the thickness is between about between about 5 degrees (deg)/inches (in) and about 80 deg/in.

The combustor as in any preceding clause, wherein the filter screen defines a thickness that is between about 0.02 inches and about 0.09 inches.

A filter for removing particulates from a fluid provided to a combustor of a gas turbine, the filter extending along a center axis from a forward end to an aft end, the filter comprising: a base flange defining an open base at the forward end; a downstream segment defining the aft end; and a filter screen comprising a thin wall extending between the base flange and the downstream segment, the filter screen defining an interior and a plurality of apertures having a non-circular shape sized to permit the fluid to pass from the interior and prevent particulates from passing from the interior.

The filter as in any preceding clause, wherein the non-circular shape is symmetrical about an axis of symmetry.

The filter as in any preceding clause, wherein the non-circular shape converges towards the axis of symmetry as the filter segment extends towards the downstream segment.

The filter as in any preceding clause, wherein the non-circular shape is a teardrop shape having a semi-circular bottom portion, a semi-circular top portion, and a tapering portion extending between the semi-circular bottom portion and the semi-circular top portion.

The filter as in any preceding clause, wherein the filter is integrally formed using an additive manufacturing system.

The filter as in any preceding clause, wherein the filter screen is shaped as a conical segment extending from a base end at the base flange to a tip end at the downstream segment.

The filter as in any preceding clause, wherein the base end defines a base diameter and the tip end defines a tip diameter, wherein the base diameter is larger than the tip diameter, and wherein the filter screen converges linearly in diameter as the filter screen extends from the base end to the tip end.

The filter as in any preceding clause, wherein the downstream segment includes a tapering segment, an orifice fitting, and a solid neck extending from the tapering segment and the orifice fitting.

The filter as in any preceding clause, wherein the filter screen defines a thickness, wherein an angle is defined between the center axis and the filter screen, and wherein a ratio between the angle and the thickness is between about between about 5 degrees (deg)/inches (in) and about 80 deg/in.

A method for fabricating a thin wall filter using an additive manufacturing system, the method comprising: (a) irradiating a layer of powder in a powder bed to form a fused region, the powder bed disposed on a build plate; (b) providing a subsequent layer of powder over the powder bed by passing a recoater arm over the powder bed; and (c)

repeating steps (a) and (b) until the filter is formed on the build plate, wherein the filter comprises: a base flange defining an open base; a downstream segment; and a filter screen extending between the base flange and the downstream segment, the filter screen defining a plurality of apertures having a non-circular shape.

The method as in any preceding clause, wherein the non-circular shape converges towards an axis of symmetry along a build direction of the additive manufacturing system.

What is claimed is:

1. A combustor for a gas turbine, the combustor comprising:
   a combustion liner that defines a combustion chamber;
   a fluid supply line for providing a fluid to the combustion chamber;
   a filter disposed in fluid communication with the fluid supply line for removing particulates from the fluid, the filter extending along a center axis from a forward end to an aft end, the filter comprising:
   a base flange defining an open base at the forward end;
   a downstream segment defining the aft end; and
   a filter screen comprising a thin wall extending between the base flange and the downstream segment, the filter screen defining an interior and a plurality of apertures having a non-circular shape sized to permit the fluid to pass from the interior and prevent particulates from passing from the interior, wherein the filter screen defines a thickness, wherein an angle is defined between the center axis and the filter screen, and wherein a ratio between the angle and the thickness is between 5 degrees (deg)/inches (in) and 80 deg/in.

2. The combustor as in claim 1, wherein the non-circular shape is symmetrical about an axis of symmetry.

3. The combustor as in claim 2, wherein the non-circular shape converges towards the axis of symmetry as the filter screen extends towards the downstream segment.

4. The combustor as in claim 2, wherein the non-circular shape is a teardrop shape having a semi-circular bottom portion, a semi-circular top portion, and a tapering portion extending between the semi-circular bottom portion and the semi-circular top portion.

5. The combustor as in claim 1, wherein the filter is integrally formed using an additive manufacturing system.

6. The combustor as in claim 1, wherein the filter screen is shaped as a conical segment extending from a base end at the base flange to a tip end at the downstream segment.

7. The combustor as in claim 6, wherein the base end defines a base diameter and the tip end defines a tip diameter, wherein the base diameter is larger than the tip diameter, and wherein the filter screen converges linearly in diameter as the filter screen extends from the base end to the tip end.

8. The combustor as in claim 1, wherein the downstream segment includes a tapering segment, an orifice fitting, and a solid neck extending from the tapering segment and the orifice fitting.

9. The combustor as in claim 1, wherein the filter screen defines a thickness that is between about 0.02 inches and about 0.09 inches.

10. A filter for removing particulates from a fluid provided to a combustor of a gas turbine, the filter extending along a center axis from a forward end to an aft end, the filter comprising:
   a base flange defining an open base at the forward end;
   a downstream segment defining the aft end; and

US 12,655,973 B1 a filter screen comprising a thin wall extending between the base flange and the downstream segment, the filter screen defining an interior and a plurality of apertures having a non-circular shape sized to permit the fluid to pass from the interior and prevent particulates from passing from the interior, wherein the filter screen defines a thickness, wherein an angle is defined between the center axis and the filter screen, and wherein a ratio between the angle and the thickness is between 5 degrees (deg)/inches (in) and 80 deg/in.

11. The filter as in claim 10, wherein the non-circular shape is symmetrical about an axis of symmetry.

12. The filter as in claim 11, wherein the non-circular shape converges towards the axis of symmetry as the filter screen extends towards the downstream segment.

13. The filter as in claim 11, wherein the non-circular shape is a teardrop shape having a semi-circular bottom portion, a semi-circular top portion, and a tapering portion extending between the semi-circular bottom portion and the semi-circular top portion.

14. The filter as in claim 10, wherein the filter is integrally formed using an additive manufacturing system.

15. The filter as in claim 10, wherein the filter screen is shaped as a conical segment extending from a base end at the base flange to a tip end at the downstream segment.

16. The filter as in claim 15, wherein the base end defines a base diameter and the tip end defines a tip diameter, wherein the base diameter is larger than the tip diameter, and wherein the filter screen converges linearly in diameter as the filter screen extends from the base end to the tip end.

17. The filter as in claim 10, wherein the downstream segment includes a tapering segment, an orifice fitting, and a solid neck extending from the tapering segment and the orifice fitting.

18. A method for fabricating a thin wall filter using an additive manufacturing system, the method comprising:

(a) irradiating a layer of powder in a powder bed to form a fused region, the powder bed disposed on a build plate;

(b) providing a subsequent layer of powder over the powder bed by passing a recoater arm over the powder bed; and (c) repeating steps (a) and (b) until the filter is formed on the build plate, wherein the filter comprises:
    a base flange defining an open base;
    a downstream segment; and
    a filter screen extending between the base flange and the downstream segment, the filter screen defining a plurality of apertures having a non-circular shape, wherein the filter screen defines a thickness, wherein an angle is defined between the center axis and the filter screen, and wherein a ratio between the angle and the thickness is between 5 degrees (deg)/inches (in) and 80 deg/in.

* * * * *